US012083763B2

(12) United States Patent
Formaggio

(10) Patent No.: US 12,083,763 B2
(45) Date of Patent: Sep. 10, 2024

(54) OSCILLATING-SHAFT MACHINES FOR GRINDING OR PRESSING ORGANIC WASTE

(71) Applicant: WASTE ENGINEERING SAGL, Paradiso (CH)

(72) Inventor: Daniele Formaggio, Este PD (IT)

(73) Assignee: WESTERN ENGINEERING SAGL, Paradiso (CH)

( * ) Notice: Subject to any disclaimer, the term of this patent is extended or adjusted under 35 U.S.C. 154(b) by 553 days.

(21) Appl. No.: 17/418,612

(22) PCT Filed: Dec. 17, 2019

(86) PCT No.: PCT/IB2019/060915

§ 371 (c)(1),
(2) Date: Jun. 25, 2021

(87) PCT Pub. No.: WO2020/136501

PCT Pub. Date: Jul. 2, 2020

(65) Prior Publication Data

US 2021/0394476 A1 Dec. 23, 2021

(30) Foreign Application Priority Data

Dec. 28, 2018 (IT) ........................ 102018000021385

(51) Int. Cl.
*B30B 9/16* (2006.01)
*B30B 9/12* (2006.01)

(52) U.S. Cl.
CPC ................ *B30B 9/121* (2013.01); *B30B 9/16* (2013.01)

(58) Field of Classification Search
CPC B30B 9/12; B30B 9/121; B30B 9/122; B30B 9/124; B30B 9/14; B30B 9/16; B02C 19/22
See application file for complete search history.

(56) References Cited

U.S. PATENT DOCUMENTS 3,760,933 A * 9/1973 Maldeis ................ F27D 1/1636 198/312
3,877,365 A * 4/1975 Berggren ................ B30B 9/121 415/72

(Continued)

FOREIGN PATENT DOCUMENTS

AT 412857 B 8/2005
CN 201046362 4/2008

(Continued)

OTHER PUBLICATIONS

BioPress DBP-205, (http://www.ecoverse.net/products/biopress-dbp-205/), 2005.

(Continued)

*Primary Examiner* — Matthew Katcoff
(74) *Attorney, Agent, or Firm* — INNOVATION CAPITAL LAW GROUP; Vic Lin

(57) ABSTRACT

This disclosure describes a machine for treating organic waste, comprising a casing which defines an inner treatment chamber for organic waste delimited at least in part by a screening grid, and an inlet opening for waste at one end of the chamber and an outlet opening at an end opposite to the inlet opening; at least one driven shaft installed in the inner chamber and provided with mechanical means for grinding or pressing the introduced organic waste against the screening grid or against at least one wall which delimits the inner treatment chamber; a first motor, having a drive shaft functionally coupled to the driven shaft; a first transmission system configured to transmit to the driven shaft a rotational movement imparted by the first motor to the drive shaft, the first transmission system comprising at least one first support bearing functionally coupled to the drive shaft. A particular feature of the machine according to the present disclosure consists in the fact that the said first transmission system comprises a second self-aligning roller bearing con- (Continued)

sec. A-A figured to allow an angular misalignment between a longitudinal axis of the driven shaft and a rotation axis of the drive shaft up to a maximum misalignment value such that a free distal end of the driven shaft may fluctuate heightwise inside the inner chamber for treating organic waste.

10 Claims, 8 Drawing Sheets

(56) References Cited

U.S. PATENT DOCUMENTS

| | | | | |
|---|---|---|---|---|
| 4,599,002 | A * | 7/1986 | Gutknecht | B30B 9/121 366/85 |
| 5,390,592 | A * | 2/1995 | Schnell | B30B 9/02 100/145 |
| 6,152,277 | A * | 11/2000 | Siliani | F16H 25/2021 192/150 |
| 6,550,376 | B2 * | 4/2003 | Johnston | B30B 9/122 100/126 |
| 10,596,577 | B2 * | 3/2020 | Mardikian | B09B 3/00 |
| 2006/0076440 | A1 * | 4/2006 | Kim | B02C 19/22 241/65 |
| 2011/0083910 | A1 * | 4/2011 | Mikulec | G01G 11/08 177/119 |

FOREIGN PATENT DOCUMENTS

| | | | |
|---|---|---|---|
| CN | 202805695 | U | 3/2013 |
| CN | 203937219 | U | 11/2014 |
| CN | 204451255 | U | 7/2015 |
| CN | 108859217 | A | 11/2018 |
| CN | 108859218 | A | 11/2018 |
| DE | 4230384 | A1 | 3/1994 |
| JP | S59202200 | A | 11/1984 |
| JP | 2007136311 | A | 6/2007 |

OTHER PUBLICATIONS

International Search Report & Written Opinion dated Apr. 14, 2020 from PCT Application No. PCT/IB2019/060915.

* cited by examiner sec. A-A sec. A-A sec. A-A

OSCILLATING-SHAFT MACHINES FOR GRINDING OR PRESSING ORGANIC WASTE

TECHNICAL SECTOR

The present disclosure relates to machines for treating waste and more particularly a machine for treating organic waste, which may be an endless-screw pressing or grinding machine.

BACKGROUND

Waste treatment pressing/grinding machines are able to treat organic material resulting from waste collection, by separating at least partially the liquid part from the solid part. Differently from the machines which merely break up the waste, pressing machines must produce a solid residue which is substantially water-free. The liquid fraction may be used for the production of biogas, while the solid fraction may be burned or used for composting. A machine of this type which is currently commercially available is for example the machine produced by DOPPSTADT™ under the trade name BioPress DBP-205 (http://www.ecoverse.net/products/biopress-dbp-205/), which is well-known and will be not described in further detail.

Pressing machines typically consist of a conical-axis endless pressing screw, which rotates inside a cylindrical chamber delimited at the bottom by screening grids with openings suitable for allowing the liquid, but not solid material, to pass through. The conical-axis endless screw is shaped so that:

- at an end for introducing the waste into the cylindrical chamber, there is a greater distance between the axis of the endless screw and the walls of the cylindrical chamber;
- inside the cylindrical chamber the diameter of the endless screw increases in the direction from the opening for introducing the waste to the opening for discharging the waste devoid of the liquid fraction.

When organic waste is introduced into the cylindrical chamber through the inlet opening, it starts to be crushed between the screening grid which delimits the cylindrical chamber and the part of the endless screw shaft which has a smaller diameter. When the endless screw is rotated, the waste is made to advance inside the cylindrical chamber towards the zones where the shaft has a bigger diameter, so that it is always pressed against the grids which delimit the cylindrical wall. Once the waste has crossed longitudinally the cylindrical wall, the liquid fraction has already fallen through the grids, so that only the solid fraction is output from the discharge opening.

One drawback of these machines is that they are prone to damage of the grids and the augers, typically due to hard objects such as stones which are mixed up with the waste to be pressed and end up inside the machine. When a stone enters the machine and becomes lodged between the auger and the screening grid or becomes lodged between the two oppositely arranged augers (where the grinding machine has two of them) a protection sensor detects an increase in the torque level of the motor and stops it.

However, even the fastest protection sensors are unable to interrupt operation of the motor as soon as the blockage occurs, so that the machine forces the rotation of the auger for a certain time period before stopping. This time period is, however, sufficient for the machine to suffer irremediable damage, such that it must be taken out of service and repaired before it can used again, with the consequent costs for spare parts and downtime.

This problem is even more critical in the case of relatively high power grinding machines where it is important to prevent the occurrence of situations where the auger which grinds the waste may be subject to excessive forces.

SUMMARY

Experiments carried out by the Applicant have shown that it is possible to overcome this drawback. As mentioned above, stones or other hard waste risk damaging the endless screw profiles of the pressing machines since they may become lodged between the profiles and the casing. This occurs, however, because the shaft on which the profiles are mounted is firmly coaxially coupled to the rotating shaft of the motor which causes it to rotate. Consequently, the profiles are all at the same distance from the inner walls of the casing and so it may happen that a stone becomes lodged between them and the casing.

Differently according to the present disclosure, the shaft which is located inside the inner chamber of the waste treatment machine is coupled to the motor shaft by means of an oscillating bearing, for example an oscillating roller bearing, which allows an angular misalignment between the longitudinal axis of the inner chamber shaft and the motor shaft.

More precisely, this disclosure provides a machine for treating organic waste as defined in claim 1. A particular feature of the machine is that it comprises a system for transmission of the movement from a drive shaft to the driven shaft of the machine, which is installed inside the inner chamber for pressing or grinding the waste, with a self-aligning bearing for allowing an angular misalignment between the longitudinal axis of the driven shaft and the axis of rotation of the drive shaft, so that a free distal end of the driven shaft may fluctuate heightwise inside the inner chamber of the machine.

According to this disclosure, the organic waste treatment machine may be a pressing machine with a single endless screw or double endless screw, or a grinding machine with hammers pivotably mounted on the periphery of the driven shaft installed inside the inner chamber of the machine.

The claims as deposited form an integral part of the present disclosure and are incorporated herein by way of specific reference.

DETAILED DESCRIPTION

Figure 1:
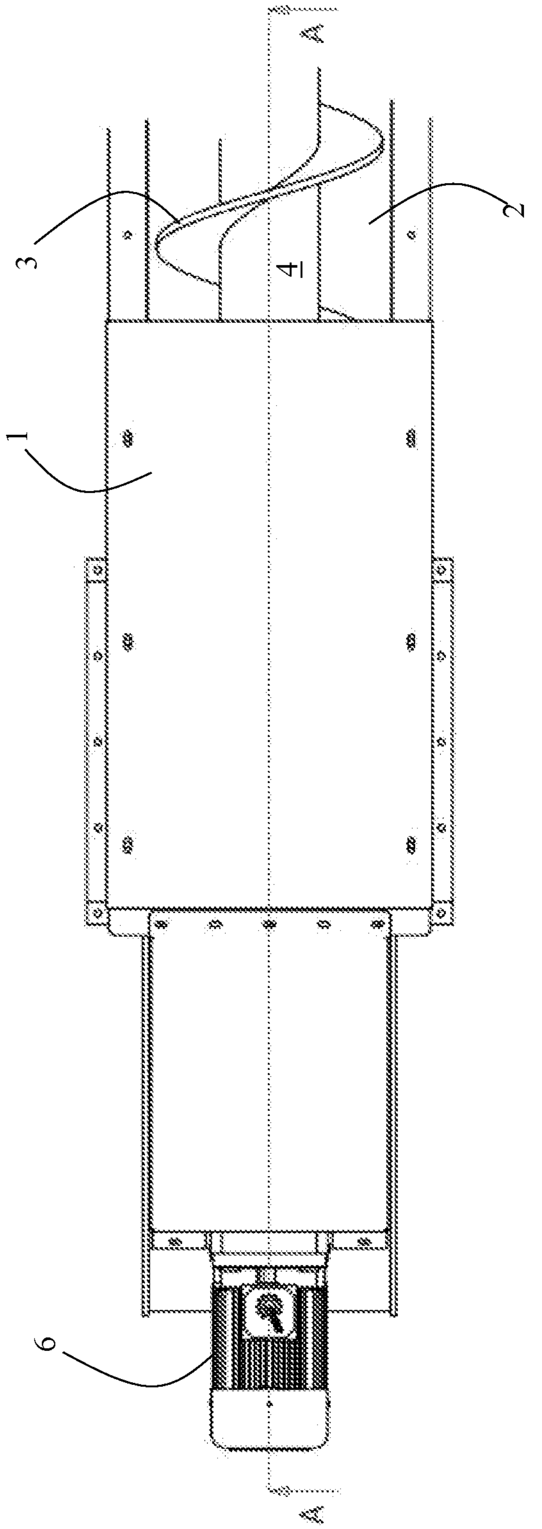
FIG. 1 is a partial top-plan view of a pressing machine with a single horizontal endless screw according to the present disclosure.

A machine for pressing waste according to the present disclosure, of the horizontal endless screw type, is shown in FIG. 1. It comprises a casing 1 which defines inside it a chamber for treating organic waste, an inlet opening for waste at one end of the inner chamber and an outlet opening at the opposite end. Typically, the inner chamber will be delimited at the bottom by a screening grid, formed with meshes having mesh apertures of a suitable size for allowing the liquid to pass through and retaining solid waste.

Figure 2:
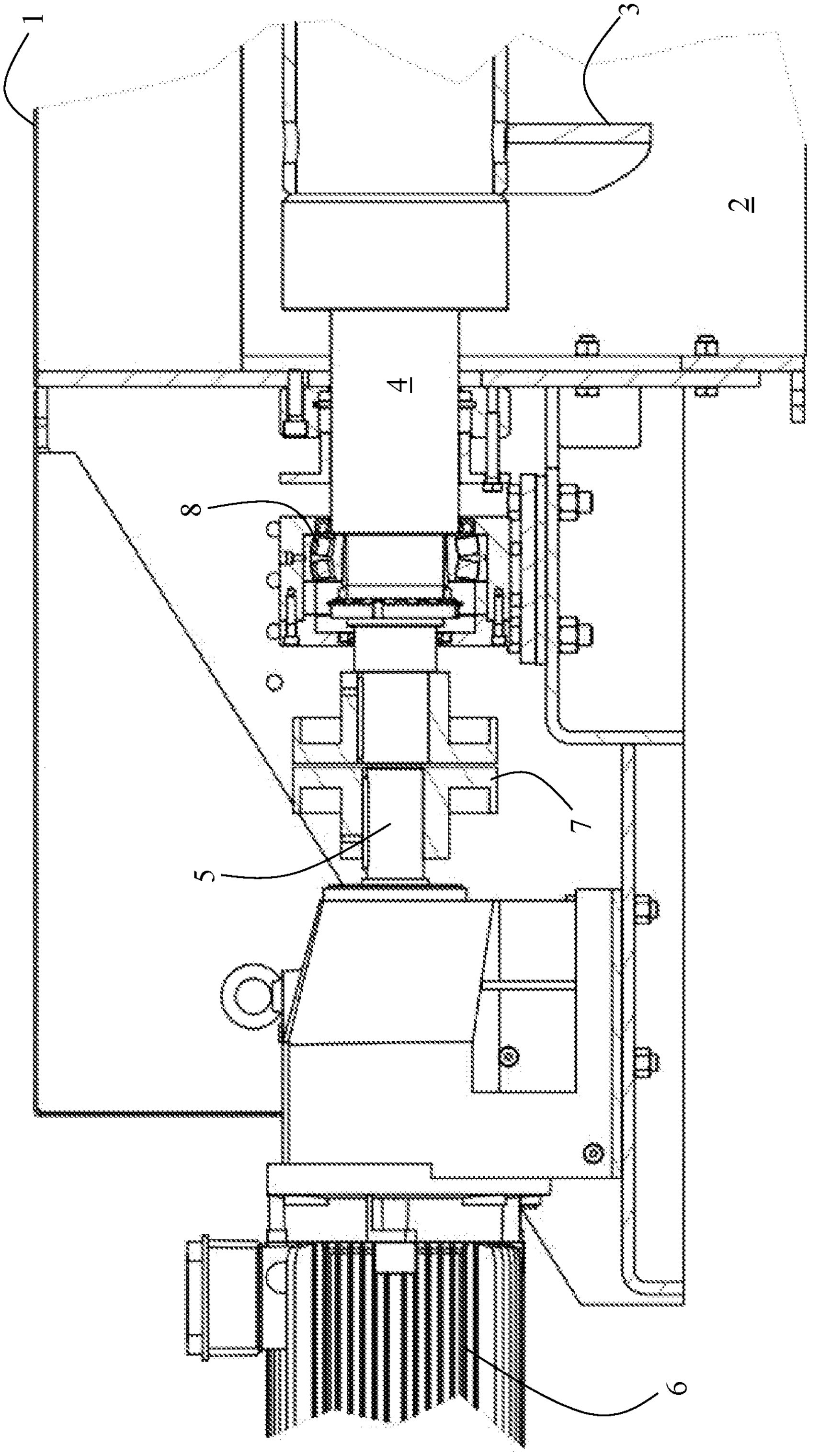
FIG. 2 is a cross-sectional view of the machine shown in FIG. 1, with a transmission system comprising an oscillating roller bearing.

Differently from similar machines which are at present commercially available, the pressing machine of this disclosure has a shaft with an endless screw profile which is able to rotate, while its axis oscillates heightwise inside the inner chamber. The cross-sectional view in FIG. 2 shows the casing 1 which delimits the inner chamber 2 for treating the waste, the endless screw 3 with its shaft 4, driven by the drive shaft 5 of the motor assembly 6 via a transmission system. The driven shaft 4 with the endless screw profile 3 is coupled to the motor by means of a first bearing which supports the drive shaft, a transmission 7 typically, but not necessarily, of the oil-hydraulic type, and a second oscillating bearing 8 which in FIG. 2 is of the roller type and which supports one end of the driven shaft 4, allowing the opposite free end to fluctuate heightwise.

Figure 3A:
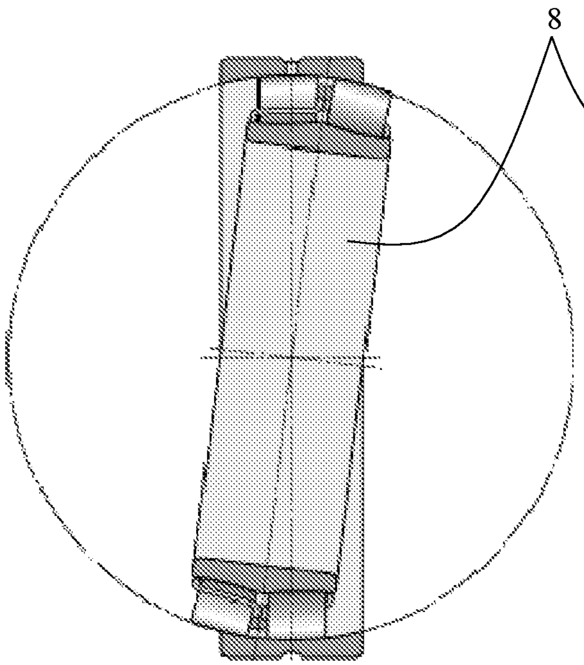
FIGS. 3A and 3B illustrate the operating principle of an oscillating bearing of the roller type and ball type, respectively, for allowing an axial misalignment a between the longitudinal axis of a shaft and the axis of rotation of a motor.
Figure 3B:
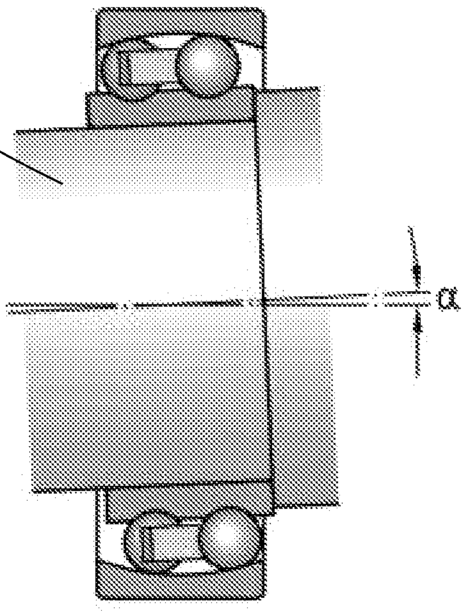

This effect is obtained by means of oscillating bearings, such as the oscillating bearings shown in FIGS. 3A and 3B, which may be for example of the type produced by SKF (www.skf.com) and currently commercially available. An oscillating roller bearing is typically formed with two rows of rollers and allows a maximum angular misalignment a between the longitudinal axis of the driven shaft 4 and the casing 1 of the machine.

When the pressing or grinding machine of the present disclosure is empty and contains no waste, the free end of the driven shaft 4 is misaligned with respect to the axis of rotation of the drive shaft 5 because of its weight, and the endless screw 3 touches the inner chamber 2 inside which the waste is ground or pressed. As the waste is introduced, the inner chamber 2 of the machine is filled and the free end of the driven shaft 4 is raised from the bottom of the inner chamber 2, being arranged approximately in the centre thereof during a normal operating condition when full of waste.

When in operation, the machine according to the present disclosure functions practically in the manner of an ordinary waste grinding or pressing machine. If, however, there should be a stone or other hard object mixed up with the waste, there is no risk of it damaging the endless screw 3 of the machine or underlying screening meshes which delimit the inner chamber for grinding/pressing the waste, as instead occurs in the ordinary grinding/pressing machines. In fact, even if a stone should become lodged between the endless screw 3 and a screening mesh, the free end of the driven shaft 4 is raised owing to the self-aligning roller bearing 8. In this way, the stone is able to be freed and advance inside the inner chamber 2 until it reaches the discharge outlet.

Not only does the self-aligning roller bearing 8 prevent—or at least greatly reduce—the damage to the endless screw and to the screening meshes, but it also protects the motor from becoming seized. In fact, the sudden stresses due to the temporary wedging of the stone are absorbed by the self-aligning roller bearing (of the type shown cross-sectioned in FIG. 2), so that they are not transmitted to the bearing supporting the drive shaft 5. Consequently, it becomes possible to increase the power of the motor—and therefore the speed of rotation of the driven shaft 4 and the productivity of the machine—without the fear of a hard object, which has become mixed up by mistake with the waste to be ground/pressed, from being able to damage the machine.

Figure 4:
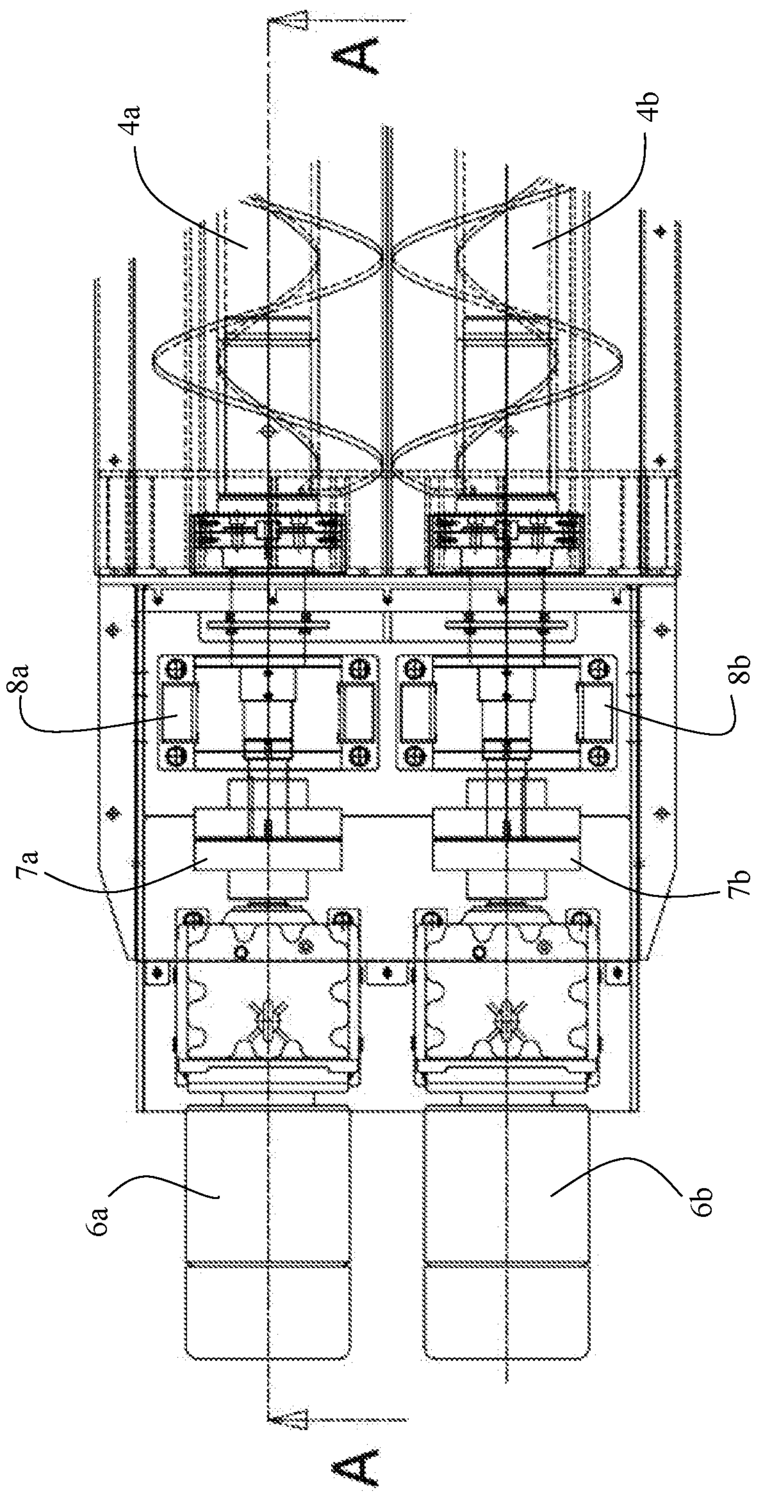
FIG. 4 is a partial top-plan view of a pressing machine with a double horizontal endless screw according to the present disclosure.
Figure 5:
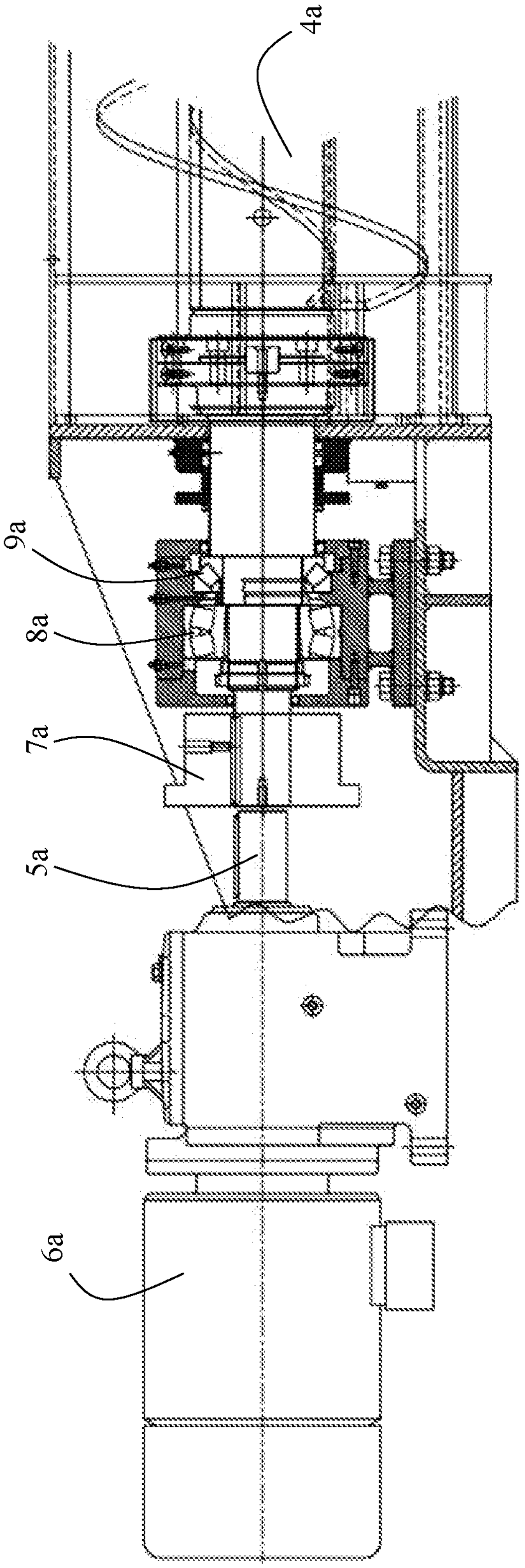
FIG. 5 is a cross-sectional view of the machine shown in FIG. 4, with two transmission systems comprising oscillating bearings of the roller or ball type.

In the example shown in FIGS. 1 and 2, reference has been made to a pressing machine which has a single driven shaft 4 with an endless screw profile 3, but it is possible to provide a pressing machine with two driven shafts 4*a* and 4*b*, as shown in FIGS. 4 and 5, each moved by a respective motor 6*a* and 6*b* and connected thereto via a respective transmission 7*a* and 7*b* and via respective self-aligning bearings 8*a* and 8*b* of the roller type. The cross-sectional view of FIG. 5 shows a self-aligning roller bearing 8*a* and, downstream thereof on the opposite side to the motor 6*a*, a conical roller bearing 9*a*.

Figure 6:
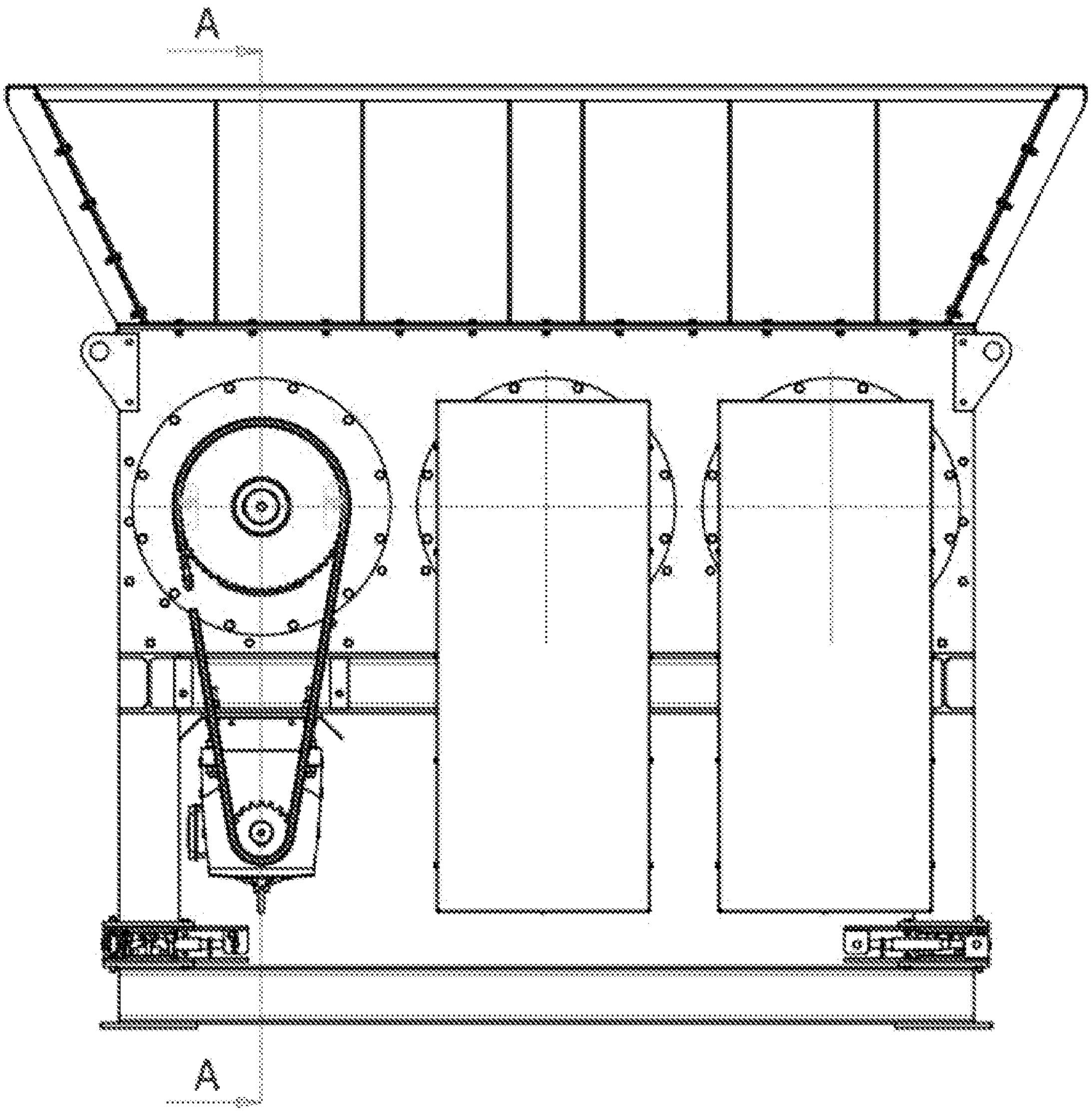
FIG. 6 is a partial side view of a vertical pressing machine according to the present disclosure with three endless screws.
Figure 7:
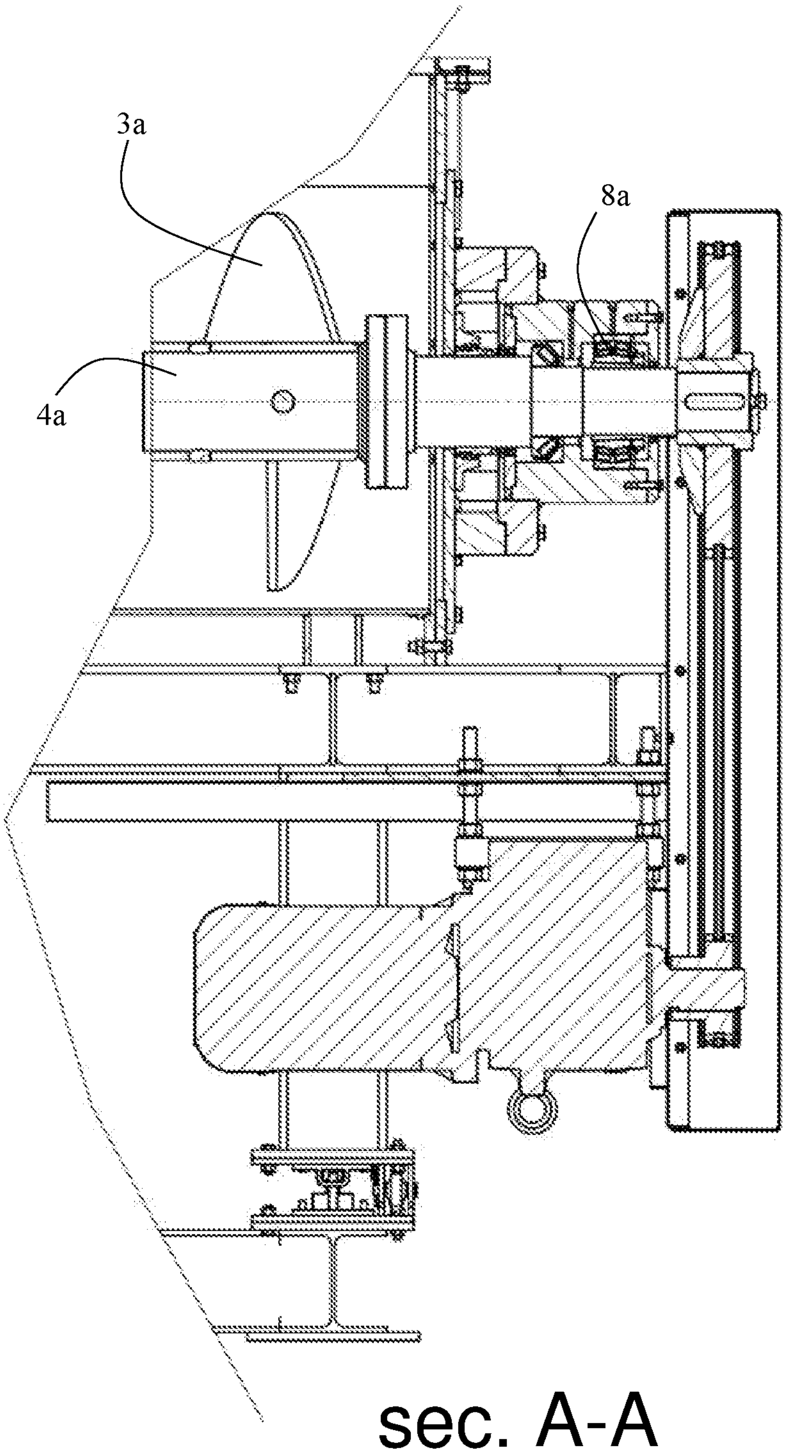
FIG. 7 is a cross-sectional view of the machine shown in FIG. 6, which illustrates an oscillating roller or ball bearing transmission system of one of the three endless screws.

FIGS. 6 and 7 show a waste pressing machine of the vertically extending type, comprising three driven shafts with endless screw profiles. Each driven shaft is moved by a respective motor and is coupled thereto via a respective transmission with a self-aligning roller bearing 8*a*, as shown in the cross-sectional view of FIG. 7. The view in FIG. 6 also shows a toothed-belt or chain transmission system which couples the drive shaft to the driven shaft.

According to an aspect not shown in the Figures, the drive shaft and the driven shaft are coupled together by means of pulleys on which a friction belt is wound, as described in Italian patent application No. 102017000150259, filed on 28 Dec. 2017, in the name of the same Applicant. The tension of the friction belt is calibrated so that the belt slips on at least one of the pulleys of the drive shaft or the driven shaft when the motor torque exceeds a nominal maximum value. In this way, the machine is provided with a further system for protection against any stones which become lodged between the profiles.

As explained in the aforementioned Italian patent application, which is incorporated herein by way of specific reference, seizing of the profiles due to material which has become lodged between them and the walls of the inner chamber results in a sudden increase in the twisting torque required by the motor, which causes the friction belt to slip. This event may be readily detected by special sensors, which cause the generation of an alarm signal and the stoppage of the motor of the driven shaft which is blocked, so as to prevent damage to the profile.

Figure 8:
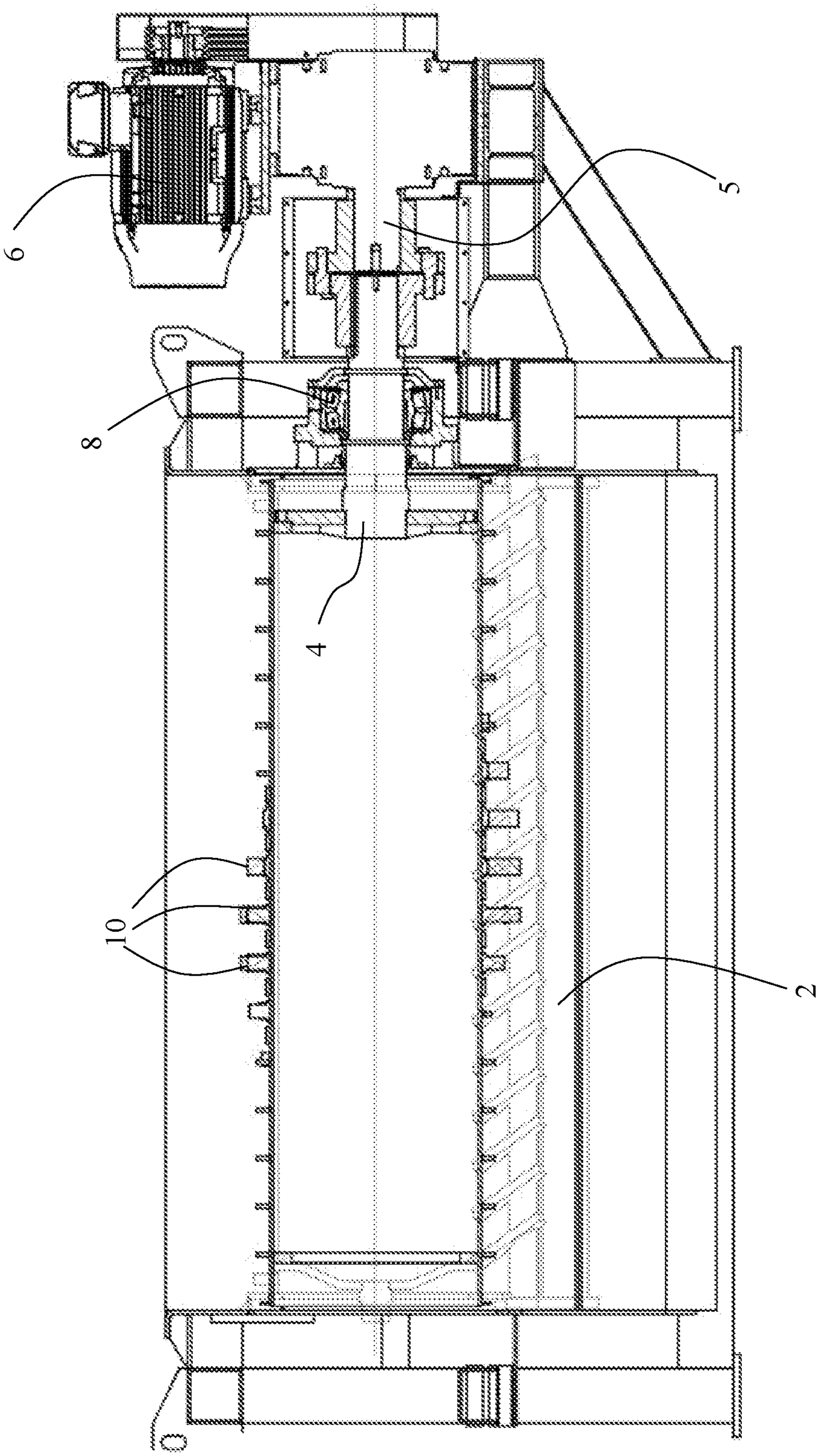
FIG. 8 is a cross-sectional side view of a horizontal grinding machine according to the present disclosure with a shaft comprising grinding hammers, where the shaft is coupled to the motor by means of an oscillating roller bearing.

A waste grinding machine, according to one aspect of this disclosure, is shown in FIG. 8. Like the known machine described in Italian patent application No. 102016000105648 filed on 20 Oct. 2016 in the name of the same Applicant, incorporated herein by way of specific reference, it has a driven shaft which has pivotably mounted thereon hammers 10, which grind the waste when the driven shaft 4 is made to rotate, and discharging beaters, which are mounted on the free end, for expelling plastic and recyclable material separated from the organic waste mush, which drips through the bottom screening meshes of the inner chamber 2. The driven shaft 4 is coupled to the motor by means of a self-aligning bearing, which in the case of FIG. 8 is of the roller type. Since the free end of the driven shaft is directed downwards when the inner grinding chamber of the machine is practically empty, it is ensured that the maximum angular misalignment of the driven shaft 4 is limited so that the hammers 10 and the discharge beaters do not hit against any internal part of the machine.

The invention claimed is:

1. A machine for treating organic waste, comprising:
- a casing defining an inner treatment chamber for organic waste delimited at least in part by a screening grid, and an inlet opening for waste at one end of the chamber and an outlet opening at an end opposite to the inlet opening;
- at least one driven shaft installed in said inner treatment chamber and provided with mechanical means for grinding or pressing the introduced organic waste against the screening grid or against at least one wall which delimits the inner treatment chamber;
- a first motor having a drive shaft functionally coupled to said driven shaft;
- a first transmission system configured to transmit to said driven shaft a rotational movement imparted by said first motor to the drive shaft;
- characterized in that said first transmission system comprises:
- a self-aligning bearing, configured to allow an angular misalignment between a longitudinal axis of the driven shaft and a rotation axis of the drive shaft up to a maximum misalignment value, such that a free distal end of the driven shaft may fluctuate heightwise inside said inner treatment chamber for treating organic waste.

2. The machine according to claim 1, configured to press organic waste inside said inner treatment chamber delimited by said screening grid, wherein said driven shaft provided with mechanical means is a first endless screw having a profile configured to crush the organic waste against said screening grid when the endless screw is rotated by said first motor.

3. The machine according to claim 2, wherein said self-aligning bearing is configured to allow a maximum angular misalignment between the longitudinal axis of the driven shaft and the axis of rotation of the drive shaft of said first motor such that an edge of the profile of a free end of the first endless screw touches an inner surface of said casing.

4. The machine according to claim 3, comprising:
- a second endless screw identical to said first endless screw, installed in said inner treatment chamber of the machine and configured to press organic waste by cooperating with said first endless screw,
- a second motor identical to said first motor,
- a second transmission system, identical to said first transmission system, configured to transmit to the driven shaft of the second endless screw a rotational movement along a longitudinal axis, generated by said second motor.

5. The machine according to claim 4, wherein said first transmission system comprises a first driving pulley connected to the motor, a second driven pulley integral with the drive shaft, and a friction transmission belt extending between the first driving pulley and the second driven pulley.

6. A machine for treating organic waste, comprising:
- a casing defining an inner treatment chamber for organic waste delimited at least in part by a screening grid, and an inlet opening for waste at one end of the chamber and an outlet opening at an end opposite to the inlet opening;
- at least one driven shaft installed in said inner treatment chamber and provided with mechanical means for grinding or pressing the introduced organic waste against the screening grid or against at least one wall which delimits the inner treatment chamber, the at least one driven shaft having a free distal end;
- a first motor having a drive shaft functionally coupled to said driven shaft at a proximal end thereof, opposite the free distal end;
- a self-aligning bearing, configured to allow a temporary angular misalignment between a longitudinal axis of the driven shaft and a rotation axis of the drive shaft up to a maximum misalignment value, such that the free distal end of the driven shaft fluctuates height-wise inside said inner treatment chamber for treating organic waste.

7. The machine according to claim 6, configured to press organic waste inside said inner treatment chamber delimited by said screening grid, wherein said driven shaft provided with mechanical means is a first endless screw having a profile configured to crush the organic waste against said screening grid when the endless screw is rotated by said first motor.

8. The machine according to claim 7, wherein said self-aligning bearing is configured to allow a maximum angular misalignment between the longitudinal axis of the driven shaft and the axis of rotation of the drive shaft of said first motor such that an edge of the profile of a free end of the first endless screw touches an inner surface of said casing.

9. The machine according to claim 8, comprising:
- a second endless screw identical to said first endless screw, installed in said inner treatment chamber of the machine and configured to press organic waste by cooperating with said first endless screw, and
- a second motor identical to said first motor.

10. The machine according to claim 9, further comprising a first driving pulley connected to the motor, a second driven pulley integral with the drive shaft, and a friction transmission belt extending between the first driving pulley and the second driven pulley.

* * * * *